US010412777B2

(12) United States Patent
Murakami

(10) Patent No.: US 10,412,777 B2
(45) Date of Patent: Sep. 10, 2019

(54) ELECTRONIC APPARATUS AND METHOD

(71) Applicants: Qingdao Hisense Electronics Co., Ltd., Qingdao OT (CN); TOSHIBA VISUAL SOLUTIONS CORPORATION, Misawa-shi, Aomori OT (JP)

(72) Inventor: Masatoshi Murakami, Hamura Tokyo (JP)

(73) Assignees: Qingdao Hisense Electronics Co., Ltd., Qingdao (CN); Toshiba Visual Solutions Corporation, Misawa-shi (JP)

( * ) Notice: Subject to any disclaimer, the term of this patent is extended or adjusted under 35 U.S.C. 154(b) by 20 days.

(21) Appl. No.: 15/856,976

(22) Filed: Dec. 28, 2017

(65) Prior Publication Data
US 2018/0338341 A1 Nov. 22, 2018

(30) Foreign Application Priority Data

May 19, 2017 (JP) .................................. 2017-100273

(51) Int. Cl.
*H04W 76/16* (2018.01)
*H04W 4/80* (2018.01)
(Continued)

(52) U.S. Cl.
CPC ............. *H04W 76/16* (2018.02); *H04W 4/80* (2018.02); *H04W 8/005* (2013.01); *H04W 84/12* (2013.01); *H04W 88/16* (2013.01); *H04W 92/02* (2013.01)

(58) Field of Classification Search
CPC ....... H04W 4/80; H04W 76/16; H04W 84/12; H04W 88/16; H04W 8/005; H04W 92/02;
(Continued)

(56) References Cited

U.S. PATENT DOCUMENTS 6,167,251 A 12/2000 Segal et al.
6,836,651 B2 12/2004 Segal et al.
(Continued)

FOREIGN PATENT DOCUMENTS

EP 3110118 A1 12/2016
JP 2002-33839 A 1/2002
(Continued)

OTHER PUBLICATIONS

U.S. Appl. No. 15/857,288, filed Dec. 28, 2017, Murakami.

*Primary Examiner* — Ahmed Elallam
(74) *Attorney, Agent, or Firm* — Hauptman Ham, LLP

(57) ABSTRACT

According to one embodiment, system includes a receiver and electronic circuitry. The electronic circuitry configured to determine whether the first user is present near a first apparatus of apparatuses, determine whether the first user is present near a second apparatus of the apparatuses, establish a first communication route with the first apparatus for the communication with the first user in response to the request, if it is determined that the first user is present near the first apparatus, and establish a second communication route with the second apparatus for the communication with the first user in response to the request, if it is determined that the first user is present near the second apparatus.

13 Claims, 13 Drawing Sheets

(51) Int. Cl.
*H04W 8/00* (2009.01)
*H04W 84/12* (2009.01)
*H04W 88/16* (2009.01)
*H04W 92/02* (2009.01)

(58) Field of Classification Search
CPC ... H04W 4/02; H04W 84/18; H04M 2250/02; H04M 2250/12; H04M 3/42263; H04M 2203/2094; H04M 2242/30; H04M 2250/10; H04M 2250/52; H04M 3/543; H04B 1/3827
See application file for complete search history.

(56) References Cited

U.S. PATENT DOCUMENTS

| | | | |
|---|---|---|---|
| 8,787,543 | B2 | 7/2014 | Peregrin Emparanza et al. |
| 9,152,787 | B2 | 10/2015 | Gathala et al. |
| 9,189,624 | B2 | 11/2015 | Gathala et al. |
| 9,202,047 | B2 | 12/2015 | Gupta et al. |
| 9,292,685 | B2 | 3/2016 | Gupta et al. |
| 9,298,494 | B2 | 3/2016 | Gathala et al. |
| 9,319,897 | B2 | 4/2016 | Gupta et al. |
| 9,324,034 | B2 | 4/2016 | Gupta et al. |
| 9,330,257 | B2 | 5/2016 | Valencia et al. |
| 9,349,001 | B2 | 5/2016 | Gathala et al. |
| 9,491,187 | B2 | 11/2016 | Sridhara et al. |
| 9,495,537 | B2 | 11/2016 | Gupta et al. |
| 9,900,171 | B2 * | 2/2018 | Guedalia ................ H04L 67/16 |
| 2005/0170818 | A1 | 8/2005 | Netanel et al. |
| 2012/0033795 | A1 | 2/2012 | Peregrin Emparanza et al. |
| 2013/0303154 | A1 | 11/2013 | Gupta et al. |
| 2013/0303159 | A1 | 11/2013 | Gathala et al. |
| 2013/0304676 | A1 | 11/2013 | Gupta et al. |
| 2013/0304677 | A1 | 11/2013 | Gupta et al. |
| 2013/0304869 | A1 | 11/2013 | Gupta et al. |
| 2013/0305101 | A1 | 11/2013 | Gupta et al. |
| 2013/0305358 | A1 | 11/2013 | Gathala et al. |
| 2013/0305359 | A1 | 11/2013 | Gathala et al. |
| 2014/0006513 | A1 | 1/2014 | Takaoka |
| 2014/0038560 | A1 * | 2/2014 | Lee .......................... H04W 4/16 455/411 |
| 2014/0051432 | A1 | 2/2014 | Gupta et al. |
| 2014/0053260 | A1 | 2/2014 | Gupta et al. |
| 2014/0053261 | A1 | 2/2014 | Gupta et al. |
| 2014/0112506 | A1 * | 4/2014 | Hopkins ............ H04N 21/4223 381/306 |
| 2014/0150100 | A1 | 5/2014 | Gupta et al. |
| 2014/0187177 | A1 | 7/2014 | Sridhara et al. |
| 2014/0188781 | A1 | 7/2014 | Fawaz et al. |
| 2014/0205099 | A1 | 7/2014 | Christodorescu et al. |
| 2014/0237595 | A1 | 8/2014 | Sridhara et al. |
| 2014/0245306 | A1 | 8/2014 | Gathala et al. |
| 2014/0267542 | A1 | 9/2014 | Nakamura |
| 2014/0317734 | A1 | 10/2014 | Valencia et al. |
| 2014/0337862 | A1 | 11/2014 | Valencia et al. |
| 2015/0148109 | A1 | 5/2015 | Gupta et al. |
| 2015/0356462 | A1 | 12/2015 | Fawaz et al. |
| 2015/0365787 | A1 * | 12/2015 | Farrell .................... H04W 4/02 455/456.1 |
| 2016/0088009 | A1 | 3/2016 | Gupta et al. |
| 2017/0231020 | A1 | 8/2017 | Tomici et al. |
| 2017/0353859 | A1 * | 12/2017 | Idnani .................. H04W 12/08 |
| 2018/0343138 | A1 * | 11/2018 | Murakami ........... H04L 12/282 |

FOREIGN PATENT DOCUMENTS

| | | |
|---|---|---|
| JP | 2002-527952 A | 8/2002 |
| JP | 2011-23779 A | 2/2011 |
| JP | 2011-118822 A | 6/2011 |
| JP | 2012-247841 A | 12/2012 |
| JP | 2013-110472 A | 6/2013 |
| JP | 2014-42323 A | 3/2014 |
| JP | 2016-9976 A | 1/2016 |
| JP | 2016-512631 A | 4/2016 |
| JP | 2017-506465 A | 3/2017 |
| WO | WO 2015/125451 A1 | 8/2015 |

\* cited by examiner

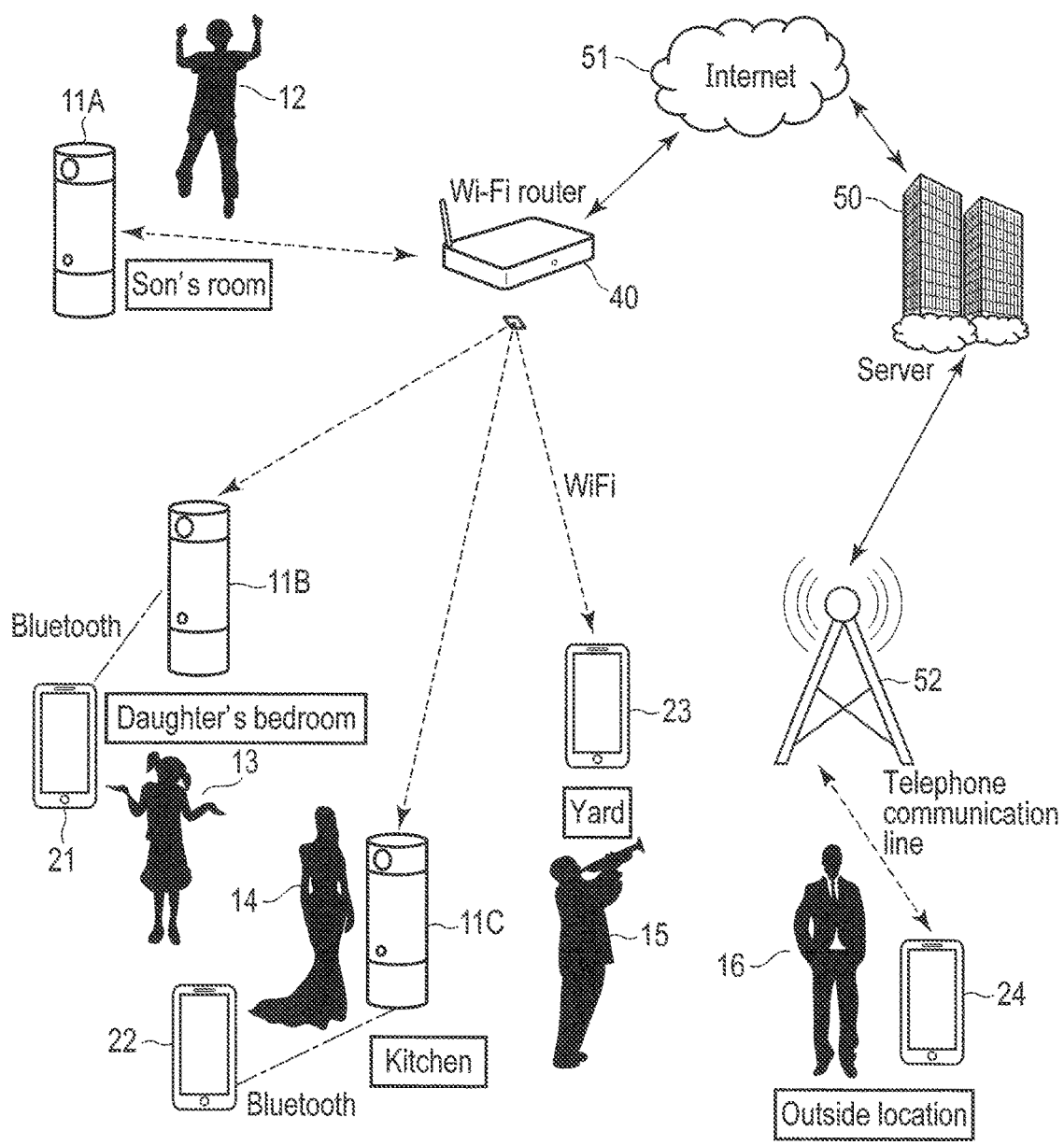
F I G. 1

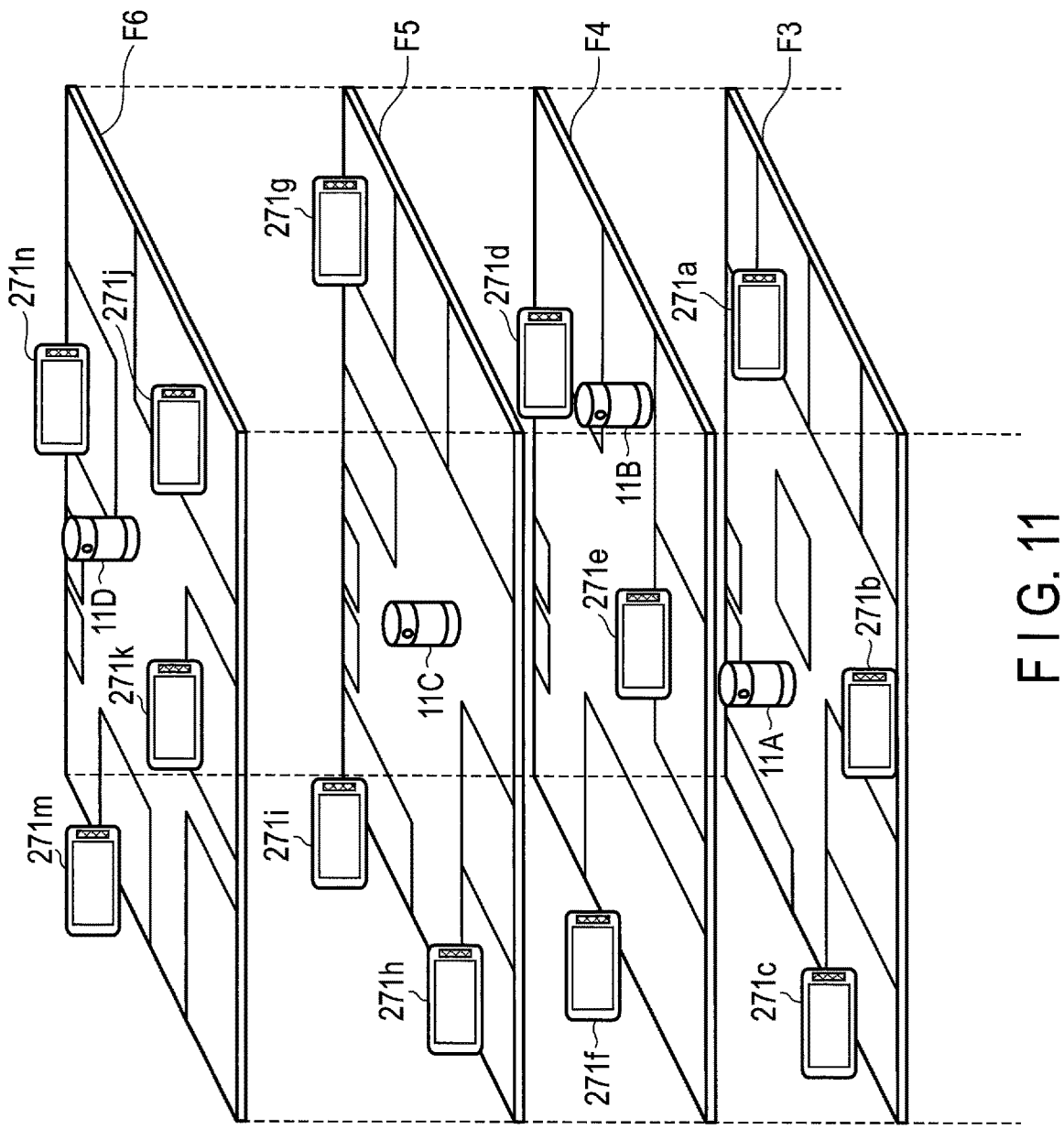
F I G. 11

| No. | Registrant ID | Nominal designation | Telephone number for portable terminal | Bluetooth ID for portable terminal | MAC address for portable terminal | Face image data | Communication device (communication device in specific room) to be called even when intended person does not bring portable terminal with him/her |
|---|---|---|---|---|---|---|---|
| 1 | Father | Father | 090-1234-5678 | 23A4FC345232 | 57AC23A69B33 | XXXX...XX | — |
| 2 | Mother | Mother | 090-8765-4321 | 23A4FC345452 | 57AC23A68B31 | XXXX...XX | — |
| 3 | Son | Katsuo | 090-1234-8765 | 23A4FC352B23 | 57AC23A69A73 | XXXX...XX | — |
| 4 | Daughter | Wakame | None | None | None | XXXX...XX | IoT 765003 |
| 5 | Grandfather | Grampa | 090-4321-8765 | 23A4FC3558D1 | 57AC23CD9B88 | XXXX...XX | — |
| ... | ... | ... | ... | ... | ... | ... | ... |

F I G. 12

| No. | Registrant ID | Level of face recognition (None/ID of communication device which detects face image) | Level of near-field communication (None/ID of detected communication device) | Level of Wi-Fi recognition (None/Detected IP address) | Acceleration sensor information (Whether person brings portable terminal with him/her) |
|---|---|---|---|---|---|
| 1 | Father | None | None | None | — |
| 2 | Mother | IoT 765001 | None | None | — |
| 3 | Son | IoT 765002 | None | None | — |
| 4 | Daughter | None | IoT 765003 | IP address: A0337C57 | Person does not bring portable terminal with him/her |
| 5 | Grandfather | None | None | IP address: A0337F23 | Person brings portable terminal with him/her |
| ... | ... | ... | ... | ... | ... |

FIG. 13

| No. | Face recognition | Recognition in near-field communication | Recognition in Wi-Fi | Acceleration sensor information of portable terminal | Situation | Destination for communication connection |
|---|---|---|---|---|---|---|
| 1 | Recognized | – | – | – | Present in room in house | Communication device of room in which face is recognized |
| 2 | Not recognized | Recognized | – | Person brings portable terminal with him/her | Present in room in house | Communication device of room recognized in near-field communication |
| 3 | Not recognized | Recognized (communication device in specific room) | – | Person does not bring portable terminal with him/her | Present in room in house | Communication device of room recognized in near-field communication |
| 4 | Not recognized | Recognized | – | Person does not bring portable terminal with him/her | Location unclear | None |
| 5 | Not recognized | | Recognized | Person brings portable terminal with him/her | Present in place where no communication device is provided in vicinity, such as yard | Recognized portable terminal (communication connecting to IP address (via Wi-Fi) |
| 6 | Not recognized | | Recognized | Person does not bring portable terminal with him/her | Location unclear | None |
| 7 | Not recognized | | Not recognized | – | Away from home | Portable terminal (via Telephone connection line or Public telecommunication network) |

F I G. 14

ELECTRONIC APPARATUS AND METHOD

CROSS-REFERENCE TO RELATED APPLICATIONS

This application is based upon and claims the benefit of priority from Japanese Patent Application No. 2017-100273, filed May 19, 2017, the entire contents of which are incorporated herein by reference.

FIELD

Embodiments described herein relate generally to an electronic apparatus and a method.

BACKGROUND

As conventional technologies, various types of talking systems such as transceivers, intercoms and portable phones were developed. In general, in calling devices which begin calls, for example, telephone numbers or an address was input in some way to determine the response (or partner) device.

Recent years have seen the development of an intercom system in which, when pluralities of partner devices are installed, their priorities are determined in advance. When a call is made, the partner device is determined in the order of descending priorities. This system has been developed to solve the following problem. If an individual call is made, the calling party may not be able to accurately specify the partner device because the room in which the intended person is present is unclear.

In recent years, devices integrally comprising a communication function, a speaker and a microphone and capable of controlling the surrounding electronic devices by the communication function have been developed. When these devices are used, a voice message can be delivered by the speaker. Further, sound can be picked up by the microphone to be transmitted.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an explanatory diagram showing an example of a communication system for a family to which one embodiment is applied.

FIG. 11 is an explanatory diagram showing a usage example when the communication system is specifically introduced into a department store, a plant, etc.

FIG. 12 shows the registration information table of the registrants, communication devices and portable terminals registered in the communication system.

FIG. 13 shows a situation table used to know the current positions of the registrants, communication devices, portable terminals, etc., registered in the communication system.

FIG. 14 shows a communication connection destination (move destination) determination table which is used when a communication route is established.

DETAILED DESCRIPTION

Figure 2:
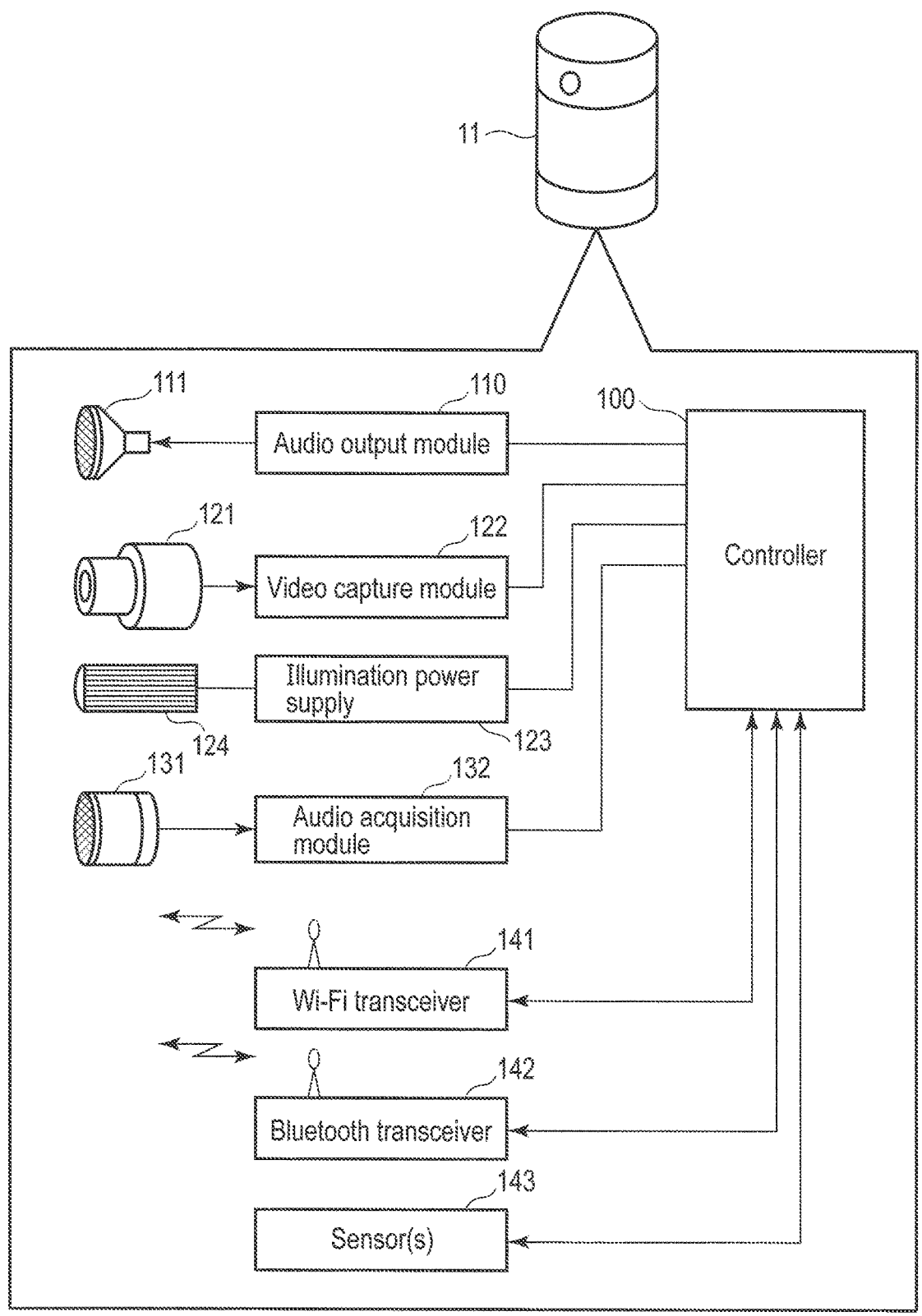
FIG. 2 shows an example of the configuration of a communication device as a representative example.

In general, according to one embodiment, a system comprises: a receiver and electronic circuitry. The receiver configured to receive a request of communication with a first user. The electronic circuitry configured to: determine whether the first user is present near a first electronic apparatus of electronic apparatuses; determine whether the first user is present near a second electronic apparatus of the electronic apparatuses; establish a first communication route with the first electronic apparatus for the communication with the first user in response to the request, if it is determined that the first user is present near the first electronic apparatus; and establish a second communication route with the second electronic apparatus for the communication with the first user in response to the request, if it is determined that the first user is present near the second electronic apparatus.

Various embodiments will be described hereinafter with reference to the accompanying drawings.

<Example of Communication System in Family>

FIG. 1 shows an example of a communication system for a family (data communication environment within an area [house]) to which one embodiment is applied.

The family includes, for example, a son 12, a daughter 13, a mother 14, a grandfather 15 and a father 16. The house of the family provides at least the room of the son, the bedroom of the daughter, a kitchen, the bedroom of the mother and father (not shown), a living room (not shown) and a yard. The members of the family bring their respective portable electronic apparatuses associated with each other in one-to-one relationship, such as smartphones, portable phones, tablet computers or wearable devices.

It is assumed that the son 12 is currently present in the room of the son. The daughter 13 is currently present in the bedroom of the daughter. The mother 14 is currently present in the kitchen. The grandfather 15 is currently present in the yard. The father 16 is currently outside the country on a business trip.

In the room of the son 12, an electronic apparatus (in other words, a communication device, an Internet-on-Things [IoT] device or an IoT device) 11A is provided. A communication device (electronic apparatus) 11B is provided in the bedroom of the daughter. A communication device (electronic apparatus) 11C is provided in the kitchen. Each communication device 11 (A, B or C; the alphabetical letters may be omitted unless necessary) may be referred to as an electronic apparatus for talking, a thing (multifunctional device) or an electronic apparatus for monitoring. The configuration of each communication device 11 (A, B or C) is explained with reference to FIG. 2.

Each of communication devices 11A, 11B and 11C is capable of performing near-field communication with a router 40. This communication is, for example, communication in accordance with Wi-Fi (registered trademark). The router 40 is capable of communicating with portable terminals in accordance with Wi-Fi. The router 40 is also capable of communicating with a server 50 via the Internet 51.

Each of communication devices 11A, 11B and 11C is capable of communicating with a portable terminal at a short distance (or a nearby portable terminal). This communication is, for example, communication in accordance with Bluetooth (registered trademark).

In the example of FIG. 1, the router 40 is capable of communicating with communication devices 11A, 11B and 11C and a portable terminal 23 in accordance with Wi-Fi. Communication devices 11B and 11C are capable of communicating with portable terminals 21 and 22, respectively, via the router 40.

The son 12, the daughter 13 and the mother 14 can call portable terminal 24 of the father 16 by means of the respective communication devices 11A, 11B and 11C or their portable terminals. At this time, the communication route is established (formed) by the router 40, the Internet 51, the server 50, an access point 52 and portable terminal 24 of the father. The father 16 can connect the communication route of his portable terminal 24 to communication devices 11A, 11B and 11C of each of the son 12, the daughter 13 and the mother 14.

FIG. 2 shows an example of the configuration of each communication device 11 (A, B or C; the alphabetical letters are added when needed).

Each communication device 11 comprises a controller 100. The controller 100 is capable of outputting audio data. An audio output module 110 applies digital-analog (D-A) conversion to the audio data such that the volume, etc., is controlled. The audio data is supplied to a speaker 111.

The video signal captured by a camera module 121 is subjected to digitalization and encoding in a video capture module 122, and is input to the controller 100. The controller 100 is capable of controlling an illumination power supply 123 to control an illumination device 124. The controller 100 is also capable of obtaining the surrounding sound by a microphone 131 and an audio acquisition module 132. The illumination device 124 is used to illuminate the area to be captured by the camera module 121 when the circumference is dark.

The controller 100 communicates with a nearby portable terminal or communication device via a transceiver 141, using a Wi-Fi function (a communication function within an area [a wireless LAN function]). The controller 100 is capable of communicating with a nearby portable terminal via a transceiver 142 in accordance with near-field communication such as Bluetooth.

Further, the detection signals from various sensors 143 may be input to the controller 100. The controller 100 may control the operation of the sensors 143 (for example, power-on, power-off or changeover of characteristics). The camera module, microphone and speaker may be turned off or on by the user's operation. In each device 11, at least one of the camera module, speaker and microphone may use the data obtained from the elements already provided. Each communication device 11 may be, for example, a computer equipped with a camera module. As the near-field communication function, for example, zigbee (registered trademark) or Z-Wave (registered trademark) may be used.

Figure 3:
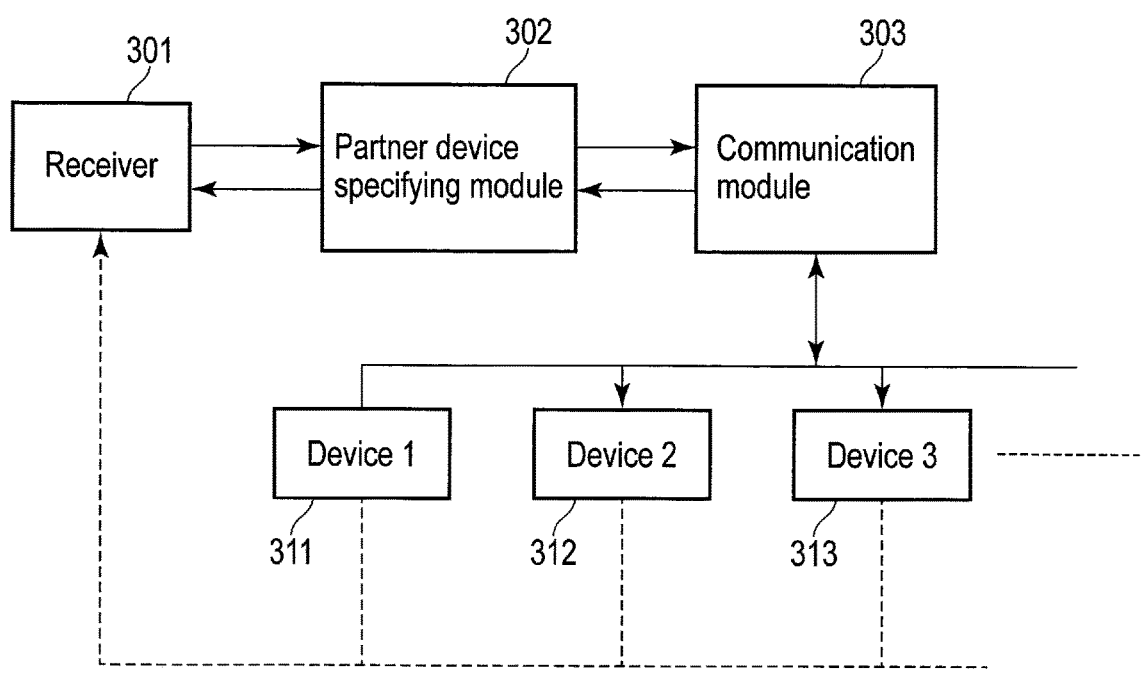
FIG. 3 shows an extracted part of the configuration of a communication system.

FIG. 3 shows an extracted part of the configuration of the communication system. A receiver 301 receives a call signal input from outside and requests communication with a first user. The first user is, for example, a user brings a device 311 or present near device 311.

A specifying module 302 is capable of specifying the first device 311 present near the first user or owned by the first user from a plurality of devices based on the call signal received by the receiver 301. A communication module 303 establishes a communication route based on the result specified by the specifying module 302 such that the first device 311 is allowed to perform communication based on the request.

The configuration shown in FIG. 3 may be constructed in a single communication device, or may be constructed in the server 50 and realized in cooperation with each device. Alternatively, the configuration may be separately realized by the devices shown in FIG. 1. As described above, the output (data) from the elements already provided, such as the speaker and camera module, may be used.

Figure 4:
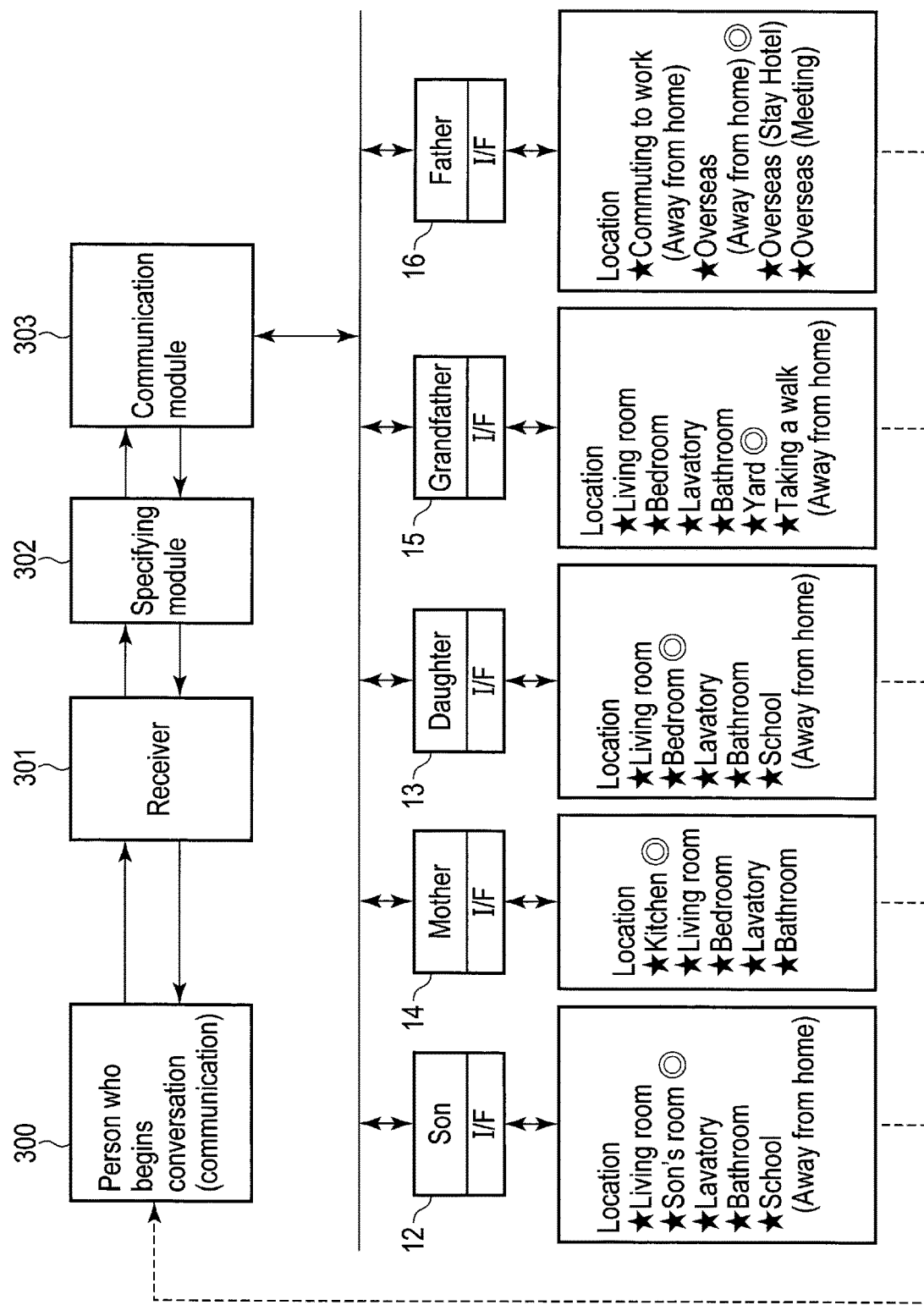
FIG. 4 exemplarily shows that the configuration shown in FIG. 3 is applied to the family shown in FIG. 1.

FIG. 4 exemplarily shows that the above configuration is applied to the family shown in FIG. 1. In the following description, this specification explains various examples in which a communication route is established between an utterer (one of the son 12, the daughter 13, the mother 14, the grandfather 15 and the father 16) who begins conversation (communication) and the intended person (one of the son 12, the daughter 13, the mother 14, the grandfather 15 and the gather 16) for the utterer. The communication route is realized via the receiver 301, the specifying module 302 and the communication module 303.

Example 1

In this system, when the person who begins conversation (the utterer) says the name (for example, "mom" or "dad") of the intended person to the communication device located near the utterer, voice (calling voice) or ringtone is automatically output to the communication device present near the intended person. The method (user interface [UI]) for identifying (specifying) the intended person may be, for example, a graphical user interface (GUI) displayed on the screen of the terminal held by the utterer, a button displayed on the screen or a button (hardware button) widely used in a remote controller in addition to a voice instruction and the authentication of the result of video recognition. For example, when a voice instruction is used, a dictionary for various ways of calling is prepared such that the same person can be specified for various ways of calling such as the name of the person, calls ("big brother" and "nanny") which can specify the individual based on information on age like brother and sister and grandfather and grandmother (father and mother), and nicknames. Further, when a voice instruction is used, the person having an age feature for the utterer can be specified by identifying the utterer by speech recognition. For example, when the daughter 13 says "Dad", the father 16 is specified. When the father 16 says "Dad", the grandfather 15 is specified.

For example, when the son 12 shown in FIG. 1 says "I want to speak to mom" in the room of the son, a communication route is formed between communication device 11C of the kitchen in which the mother 14 is present and communication device 11A of the child's room. The sound "I want to speak to mom" is output from communication device 11C. Communication device 11A is not connected to the communication devices of the other bedrooms or the communication device of the living room.

Example 2

In this case, whether the intended person (for example, the mother) is present near communication device 11C is determined by the human recognition (face recognition) function of the camera module attached to communication device 11C or the camera module provided in the room or kitchen in which the mother is present in cooperation with communication device 11C.

Example 3

For example, when the son 12 says "I want to speak to dad" in the child's room, the father may not be detected by the Wi-Fi of the communication devices or portable terminals in the house based on the router (in other words, it is determined that the father is not present in the house). In this case, the communication route is automatically connected to portable terminal 24 of the father. As shown in FIG. 1, when it is determined that the father 16 is not present in the house, a communication route is established via the router 40, the Internet 51, the server 50, the access point 52 and portable terminal 24. Thus, even when the father 16 is outside the country on a business trip, a communication route is established with the portable terminal of the father 16 via the Internet 51. It should be noted that, when the father 16 is outside the country on a business trip, for example, the message or sound "Dad is working abroad" may be output to prevent unintended establishment of a communication route via the Internet 51.

As another example, it is assumed that the mother 14 says "Grampa" to communication device 11C. In the example of FIG. 1, the grandfather 15 is present in the yard, and portable terminal 23 of the grandfather 15 is detected by the router 40. In this case, a communication route is formed via communication device 11C, the router 40 and portable terminal 23. Thus, a call is made to portable terminal 23.

Example 4

Whether the intended person is present near the communication devices provided in the house may be determined by the communication devices when near-field communication is performed between the portable terminal (device) held by the intended person and the communication devices. When the device of a room detects the smartphone of the intended person in accordance with near-field communication, the communication route is established for the device of the room.

When a communication device detects the portable terminal of the intended person in accordance with near-field communication, the communication device on the utterer side is connected to the communication device which detects the portable terminal of the intended person. For example, as shown in FIG. 1, in the room of the daughter 13, communication device 11B of the room of the daughter 13 detects nearby portable terminal 21 of the daughter. In this case, for example, when the mother 14 says "Wakame" (the daughter's name) to communication device 11C, a communication route is formed between communication device 11C and communication device 11B.

Whether the intended person is present near a communication device and brings the portable terminal with him/her is determined based on, for example, the output of the acceleration sensor information of the portable terminal. In the example of FIG. 1, when the daughter 13 touches portable terminal 21 and enjoys a game, communication device 11B detects that portable terminal 21 is present near communication device 11B in accordance with Bluetooth communication.

The method for detecting the presence of the intended person or a specific person in the vicinity (or the presence or absence of a visitor) is not limited to the detection of the portable terminal held by the partner (user) by each communication device 11, and may be any method as long as a person can be detected. For example, a person may be recognized by a camera module. Sound may be obtained by a microphone (including the use of a speaker as a microphone when the speaker is not used), and an individual may be specified based on the feature amount of the obtained sound. The presence of a person may be detected by a motion (thermal) sensor, and an individual may be specified by audio or video data. It should be noted that, for example, pets are preferably registered as the exclusion from the detection target in advance.

Example 5

When a communication device is associated with a nearby portable terminal like example 4, and further when it is determined that the portable terminal is not held by the owner, the device on the utterer side is not connected to the portable terminal (when it is determined that the portable terminal is not held by the owner, the device on the utterer side is not connected to the communication device 11 provided in the room).

In the example of FIG. 1, when the mother 14 says "Katsuo" (the name of the son 12) to communication device 11C, a communication route is merely formed between communication device 11C and communication device 11A since the son 12 does not bring a portable terminal.

Example 6

Even when it is determined that a portable terminal is not held as with example 5, if the portable terminal or the room is registered in particular, the communication device on the utterer side is connected to the portable terminal.

For example, since a portable terminal is placed on a bedside table in a bedroom, the portable terminal may be registered as a limited (special) device (it is determined that the person is present in the room even when the person does not bring the portable terminal with him/her). In this way, a connection route can be formed between the portable terminal in the bedroom and the communication device of the calling party. For example, in many cases, a person who cannot freely or easily move around the room (a sick person or a person in need of nursing care) places his/her portable terminal on a bedside table for a long time. Thus, the portable terminal is preferably registered as a limited (special) device. As the conditions for registration, the time periods in which the person is not present in the room presumably, such as the time for a meal or in a bath, are preferably excluded.

Example 7

For example, when the communication connection destination is unclear (when the communication connection destination communicable with the calling party is not found) in example 1, the user is notified of the fact from the communication device (for example, by sound).

For example, when the son 12 says "I want to speak to Mr. Yamada" in FIG. 1, and the information of Mr. Yamada is not registered in the system, communication device 11A outputs a speech (an acoustic) output of "Mr. Yamada is not registered".

Example 8

In the above examples, this specification mainly explains a communication route connected from a communication device to a portable terminal. However, a portable terminal may directly receive a call from outside (calling request [incoming call]). In this case, a communication route may be constructed in the following manner. The portable terminal may be connected to a nearby communication device.

Subsequently, the communication device may be connected to another communication device present near the owner of the portable terminal.

It is assumed that, in FIG. 1, for example, the daughter 13 moves to the kitchen and helps the mother 14 cook. When portable terminal 21 placed in the bedroom of the daughter 21 (in other words, the portable terminal of the daughter) receives a call from outside, a communication route is formed from portable terminal 21 to communication device 11B, the router 40 and communication device 11C since the electronic system knows the location of the daughter 13. As another example, when a portable terminal placed in a bedroom while recharging receives a call, the owner of the portable terminal may be present in the living room different from the bedroom. In this case, the call to the portable terminal placed in the bedroom is automatically connected to the communication device of the living room in which the owner is present via the communication device provided in the bedroom automatically connected in accordance with near-field communication. In this way, the owner can have a conversation with the calling party by the communication device of the living room.

When, regardless of whether an individual holds a portable terminal (brings a portable terminal with him/her), for example, a call is received from a family member via a communication line outside the area, and the location of the partner associated with the portable terminal cannot be specified by any communication device, the portable terminal of the partner (communication target) is notified (informed) of the reception of the call via a public telecommunication network. For example, when the calling party is unclear, a message or data indicating that the intended person is unavailable is sent back. The priority for notifying the portable terminal of the intended person that a call is received may be set in advance. For example, calls from family members and friends are preferably reported even at midnight. However, to calls from work-related calling parties, a request to call back in working hours (typical business hours) may be sent back. It is possible to put restrictions on a case where the reception of a call to a portable terminal present in a registered place is reported as with example 6, and a case where it is clear that the call is made from a family member.

<Reference Tables and Data>

Now, this specification explains reference tables and data used to dynamically construct each of the above communication routes.

FIG. 12 shows the registration information table of the registrants, communication devices and portable terminals registered in the above communication system.

FIG. 13 shows a situation table used to know the current positions of the registrants, communication devices and portable terminals registered in the above communication system.

FIG. 14 shows a communication connection destination (move destination) determination table which is used when a communication route is established as described above.

The data shown in FIG. 12 to FIG. 14 may be held by the server 50 shown in FIG. 1, or may be held by any of the communication devices shown in FIG. 1.

To accurately operate the above communication system, as shown in FIG. 12 (registration information table), it is necessary to register the people using the system, the communication devices to be used, the portable terminals to be used, etc. A security camera module, an intercom and special sensors for temperature, humidity, light and sound, incorporated into the communication system, may be added.

In the registration information table shown in FIG. 12, the identification data (ID) of the father, mother, son, daughter and grandfather as family members is registered. The nominal designations of the registrants (father, mother, Katsuo [son], Wakame [daughter] and grampa) are registered. Further, the telephone numbers of the portable terminals of the registrants, the Bluetooth IDs of the portable terminals, the MAC addresses of the portable terminals, face data, and the addresses of communication devices (IoT devices) with which a contact is made even if the owner does not bring a portable terminal with him/her are registered.

In the situation table shown in FIG. 13, the identification data (ID) of the father, mother, son (Katsuo), daughter (Wakame) and grandfather as family members is described. Situation data indicating how each member currently relates to the communication devices and portable terminals is updated and described. The situation data may be regularly updated, or may be updated when a call is made.

The communication connection destination (move destination) determination table shown in FIG. 14 shows the combinations of requirement data necessary to determine the communication route (connection route) with the location of the intended person when an utterer calls the person.

In case 1, the face of the intended person is recognized by a communication device. In case 1, the portable terminal of the intended person is not detected by any communication device in accordance with near-field communication, and the router does not detect the portable terminal of the intended person in accordance with Wi-Fi, and further, the acceleration sensor information of the portable terminal of the intended person is not obtained. In this case, it is determined that the intended person is present in the room in which the communication device which recognizes the face is provided. As a result, a communication route with the communication device which detects the face is established for the called person in case 1.

In case 2 is an example in which the face is not recognized, and the communication device associated with the intended person detects the portable terminal of the intended person in accordance with near-field communication, and further, it is clear that the intended person brings the portable terminal with him/her. In this case, it is determined that the intended person is present in the room in which the communication device is provided. In case 2, a communication route is established such that the device on the utterer side is connected to the communication device provided in the room in the house.

In case 3 is an example in which the face is not recognized, and the communication device provided in the specific room associated with the intended person detects the portable terminal of the intended person in accordance with near-field communication, and further, it is clear that the intended person does not bring the portable terminal with him/her. This example is the environment explained in example 6. In this case, it is determined that the intended person is present in the specific room. In case 3, a communication route is established such that the device on the utterer side is connected to the communication device provided in the limited (specific) room in the house.

In case 4 is an example in which the face is not recognized, and the communication device provided in the specific room associated with the intended person detects the portable terminal of the intended person in accordance with near-field communication, and further, it is clear that the intended person does not bring the portable terminal with him/her. In this case, it is determined that the location of the intended person is unclear. An exception to this case 4 is the above case 3. In case 4, the communication device notifies the user that the communication connection destination communicable with the calling party is not found (by sound, etc.,) as explained in example 7.

In case 5 is an example in which the face is not recognized, and the communication device provided in the specific room associated with the intended person does not detect the portable terminal of the intended person in accordance with near-field communication, and the router recognizes that the intended person brings the portable terminal with him/her in accordance with Wi-Fi communication. In this case, it is determined that the intended person is present near the house but in a place where no communication device (IoT device) is provided in the vicinity.

The case 5 is equivalent to a case where the mother 14 says "Grampa" to communication device 11C as explained in example 3. In this case, the device of the utterer is connected to the portable terminal in accordance with Wi-Fi communication.

In case 6 is an example in which the face is not recognized, and the communication device provided in the specific room associated with the intended person does not detect the portable terminal of the intended person in accordance with near-field communication, and the router detects the portable terminal of the intended person in accordance with Wi-Fi communication, and the intended person does not bring the portable terminal with him/her. In case 6, the communication device notifies the user that the communication connection destination communicable with the calling party is not found (by sound, etc.,) as explained in example 7.

In case 7 is an example in which the face is not recognized, and the communication device provided in the limited (specific) room associated with the intended person does not detect the portable terminal of the intended person in accordance with near-field communication, and the router does not detect the portable terminal of the intended person in accordance with Wi-Fi communication. In this case, the communication system determines that the intended person is away from home. Telephone connection is performed for the portable terminal of the intended person by the number of the portable terminal.

As explained above, this communication system is capable of determining the communication route based on the situation of the intended person. To realize this configuration, the communication system uses the registration information table shown in FIG. 12, the situation table shown in FIG. 13, and the communication connection destination (move destination) determination table shown in FIG. 14.

The registration information table shown in FIG. 12 is registered as common data when communication devices are provided in rooms.

For example, a communication device is connected to the portable terminal of a user. As the connection method, for example, the communication device is set to a registration mode. The portable terminal of the user is set to an operation mode in accordance with, for example, Bluetooth. The ID of the communication device is input to the portable terminal. In this way, the communication device can communicate with the portable terminal. The message "Enter registrant ID" is displayed on the screen of the portable terminal. The registrant ID may arbitrary. In this case, the registrant IDs of the family members are preferably different from each other. Subsequent to the registrant IDs, nominal designations such as "Katsuo", "Wakame", "dad", "mom" and "grampa" may be entered.

At this time, the telephone number, Bluetooth ID and MAC address of the portable terminal are automatically transmitted to and registered in the communication device. The message "Do you want to register face image data?" is displayed on the screen of the portable terminal. When the user registers face image data, for example, the user says "yes" or "please", facing the front side of the camera module of the communication device. Thus, the face image of the user is obtained by the communication device. When the user says "no", face image is not obtained.

In a state where the communication device is in registration mode, it is possible to register the communication device (a communication device in a specific room) to be called by forming a communication route even when it is determined that the intended person does not bring the portable terminal with him/her. This registration is performed to establish the communication route explained in case 3. In the menu of registration mode, for example, the message "Do you want to register a communication device in a specific room?" is prepared. The user may select the message, enter the ID of the communication device of a specific room in the portable terminal and select a confirmation button.

In the above communication system, the data of the situation table shown in FIG. 13 is updated when a call is made by an utterer or regularly. However, the data shown in FIG. 13 is preferably updated every time the information of a shaking portable terminal (in other words, shaking which allows determination that a portable terminal is carried) is received.

Figure 5:
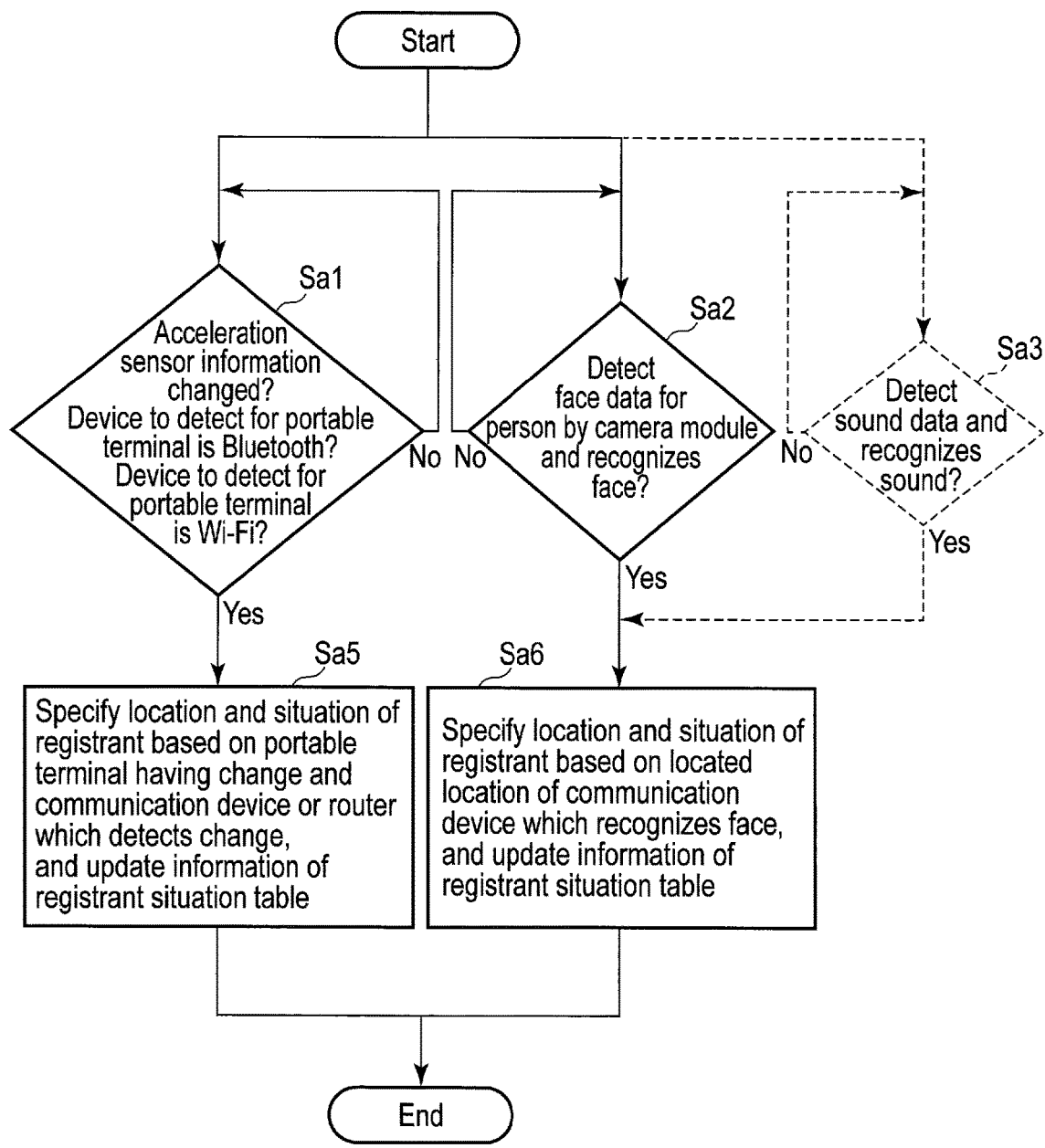
FIG. 5 shows an example of the operation flow when the data of FIG. 13 is updated.

FIG. 5 shows an example of the operation flow when the data shown in FIG. 13 is updated. When the owner of a portable terminal moves with the portable terminal, there is a change in the acceleration sensor information of the portable terminal.

This change is detected in accordance with, for example, Bluetooth communication between the communication device and the portable terminal (to detect for portable terminal is Bluetooth?) or Wi-Fi communication between the router 40 and the portable terminal (to detect for portable terminal is Wi-Fi?). Communication using Bluetooth or Wi-Fi is initiated by a controller provided in the communication device or a controller provided in the router. The obtained information regarding the change in the acceleration sensor information of the portable terminal is used to update the column of the acceleration sensor information in FIG. 13. The acceleration sensor information indicates that the owner brings the portable terminal with him/her or the owner does not bring the portable terminal with him/her. At this time, information indicating that the acceleration sensor information is detected in accordance with Bluetooth, Wi-Fi or both of them is also updated in FIG. 13 (Sa1).

The above communication process clarifies whether there is a change in the acceleration sensor information and the ID of the communication device which communicates with the portable terminal or the IP address of the router which communicates with the portable terminal. Thus, the room in which the portable terminal is present or the absence of the portable terminal in any room is confirmed. In this way, the location or situation of each registrant can be updated (Sa5).

The faces of users who register face image data in FIG. 12 can be recognized by the communication device of each room in which the camera module is turned on. Each communication device is capable of obtaining face image data when a moving object is detected by the camera module (detect face data for person by camera module and recognizes face?). The communication system is configured to compare the obtained face image data with the face image data registered in FIG. 12 and recognize the person and room of the obtained face image data (Sa2).

When the obtained face image data matches the registered face image data of a registrant, the presence of the registrant in the room of the communication device from which the data is obtained is confirmed. In accordance with the result of confirmation, the located location and situation of the registrant can be updated (Sa6).

Further, as each communication device comprises the microphone, a speech recognition function may be used. For example, the voice data of the registrants is registered in FIG. 12 in a manner similar to that of face image data (specify location and situation of registrant based on located location of communication device which recognizes face, and update information of registrant situation table). When a communication device picks up the voice of a user, the communication device recognizes the voice of the user and confirms that the user is present in the room.

Figure 6:
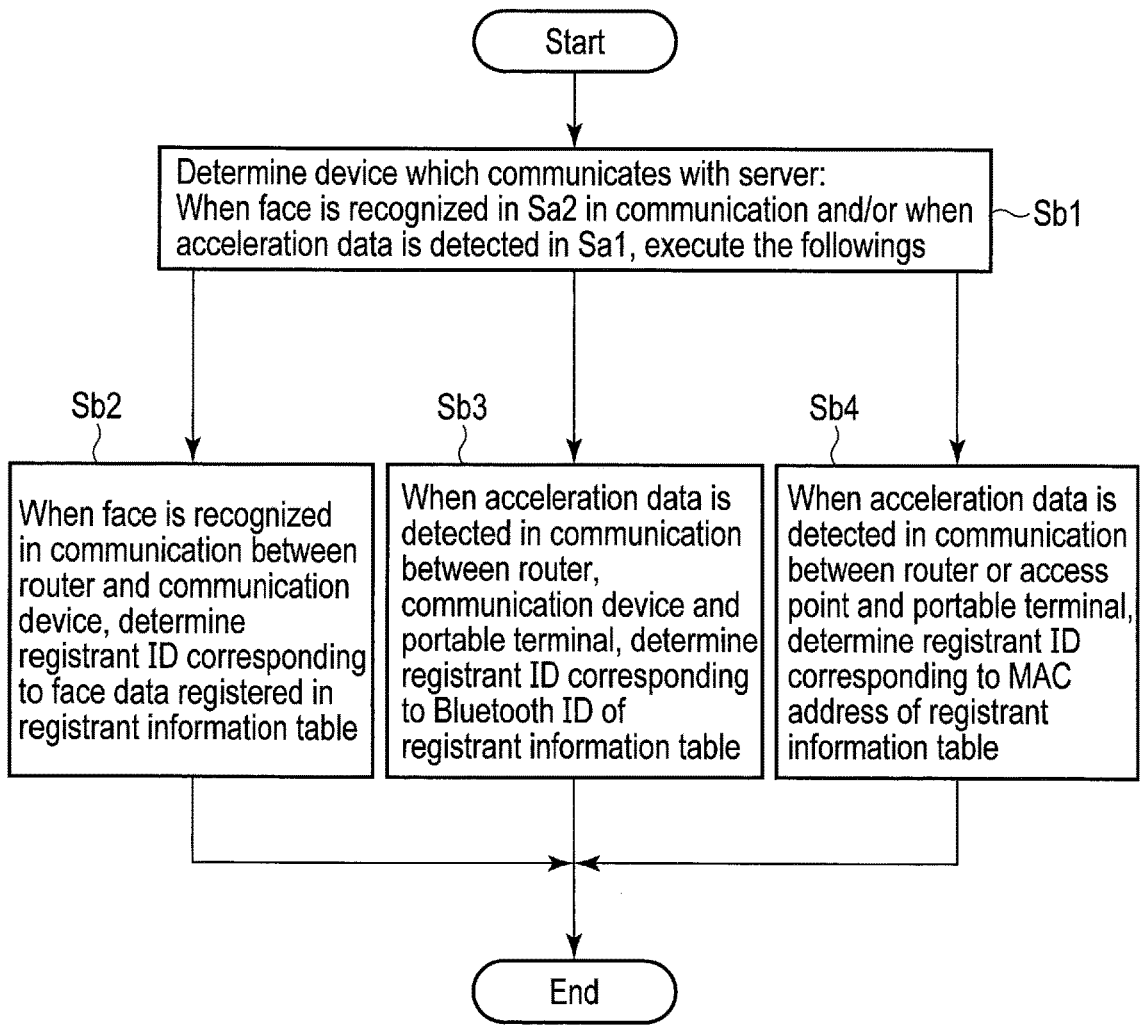
FIG. 6 is a flowchart for explaining a method in which the server of FIG. 1 specifies, based on with which device the server communicates, the registrant ID of the device, on the assumption that the server is capable of recognizing the data of FIG. 12, FIG. 13 and FIG. 14.

FIG. 6 shows a method in which the server 50 of FIG. 1 specifies, based on with which device the server 40 communicates (determine device which communicates with server, when face is recognized in Sa2 in communication and/or when acceleration data is detected in Sa1), the registrant ID of the device, on the assumption that the server 50 is capable of recognizing the data of FIG. 12, FIG. 13 and FIG. 14 (Sb1).

In block Sb2 shown in FIG. 6, the server 50 may obtain face image data based on the communication via the router 40 and one of the communication devices. In this case, registered face image data corresponding to the obtained face image data is detected. A resistant ID corresponding to the detected registered face image data is determined with reference to the registration information shown in FIG. 12 (face is recognized in communication between router and communication device, determine registrant ID corresponding to face data registered in registrant information table).

In block Sb3 shown in FIG. 6, the server 50 may detect acceleration sensor information indicating the movement of a portable terminal based on the communication via the router 40, one of the communication devices and one of the portable terminals. In this case, the Bluetooth ID used for the communication between the portable terminal and the communication device is specified with reference to FIG. 12 (acceleration data is detected in communication between router, communication device and portable terminal, determine registrant ID corresponding to Bluetooth ID of registrant information table). A registrant ID corresponding to the Bluetooth ID is determined with reference to FIG. 12.

In block Sb4 shown in FIG. 6, the server 50 may communicate with a portable terminal via the router 40 or the access point 52 and detect the acceleration sensor information of the portable terminal. In this case, when the communication is performed via the router 40, a registrant ID corresponding to the Bluetooth ID of the portable terminal is determined with reference to FIG. 12. When the communication is performed via the access point 52, a registrant ID corresponding to the telephone number of the portable terminal is determined with reference to FIG. 12 (acceleration data is detected in communication between router or access point and portable terminal, determine registrant ID corresponding to MAC address of registrant information table).

Figure 7:
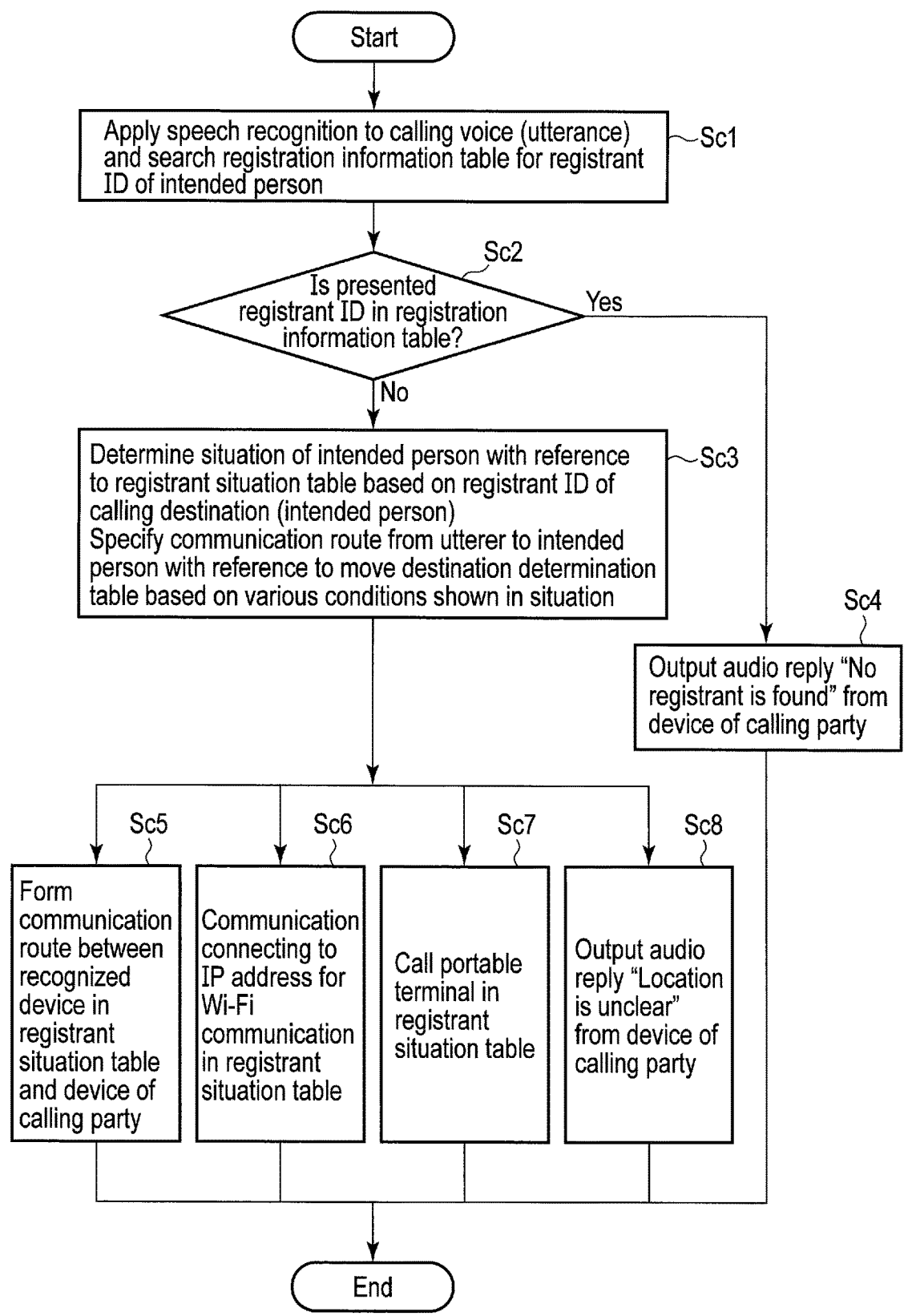
FIG. 7 is a flowchart showing an example in which the communication system of the present embodiment specifies the location of the intended person and forms a communication route.

FIG. 7 shows an example in which the communication system of the present embodiment specifies the location of the intended person and forms a communication route. It is assumed that a user speaks to the communication device of a room (speech recognition to calling voice (utterance) and search registration information table for registrant ID of intended person). In other words, it is assumed that a communication device collects calling voice (utterance). Subsequently, the communication system applies speech recognition to the calling voice (for example, "I want to speak to mom"), and searches for the registrant ID (the ID of the mother) of the intended person registered in the registration information shown in FIG. 12 (So1). When the registrant ID is not found in FIG. 12 (is not found presented registrant ID in registration information table?), the communication device of the calling party outputs the audio reply "No registrant is found" (Sc4 (Sc2—Yes)).

When the registrant ID is detected, the situation of the intended person is determined based on the registrant ID of the intended person with reference to FIG. 13. For example, in his/her room?/in another room?/away from home? (determine situation of intended person with reference to registrant situation table based on registrant ID of calling destination (intended person)). The communication route from the utterer to the intended person is specified based on the situation (specify communication route from utterer to intended person with reference to move destination determination table based on various conditions) shown in FIG. 13 (Sc3 (Sc2—No)).

The process for specifying the communication route is performed in accordance with various situations. When it is determined that the device of the intended person (registrant ID) is a communication device with reference to FIG. 13, the communication route is formed between the communication device of the calling party and the communication device (forming communication route between recognized device in registrant situation table and device of calling party) of the intended party (Sc5).

When it is determined that the device of the intended person (registrant ID) is a portable terminal using Wi-Fi communication for a call (communication connecting to IP address for Wi-Fi communication) with reference to FIG. 13, the communication route is formed with an IP address between the communication device of the calling party and the portable terminal of the intended person (Sc6).

When it is determined that the device of the intended person (registrant ID) is a portable terminal using its telephone number for a call with reference to FIG. 13, the communication route is formed with the telephone number of the portable terminal of the intended person between the communication device of the calling party and the portable terminal of the intended person (Sc7).

When the location of the intended person cannot be specified with reference to FIG. 13, the communication device of the calling party is controlled so as to output the audio reply "Location is unclear".

Figure 8:
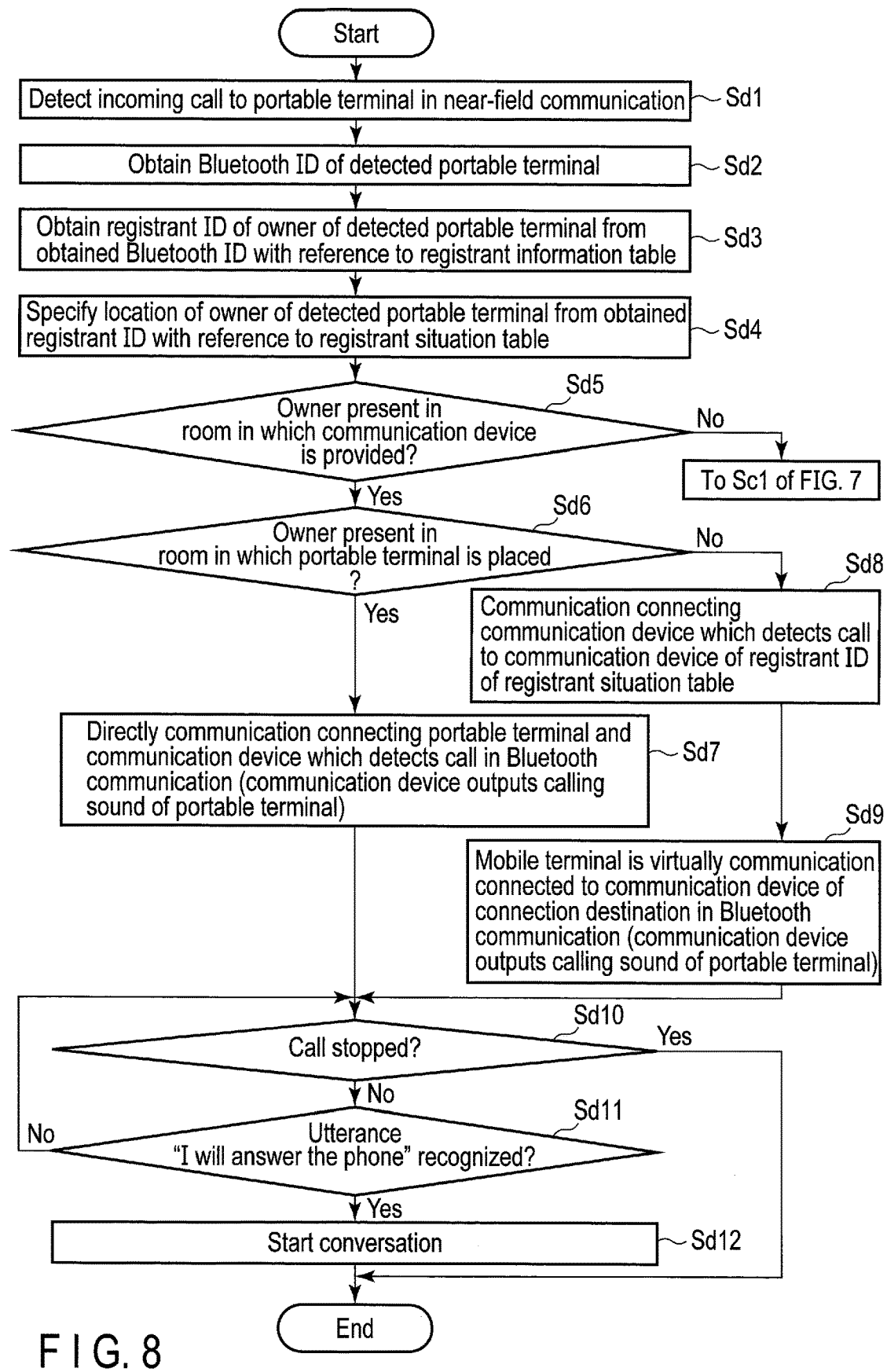
FIG. 8 is a flowchart showing another example of the operation of the communication system.

FIG. 8 is a flowchart showing another example of the operation of the communication system. In the above description, this specification mainly explains examples in which a communication route is formed from a communication device to another communication device or an external portable terminal, etc.

Further, the communication system is capable of outputting sound from each communication device or portable terminal based on the situation of the receiver (the intended person).

Each communication device is capable of detecting an incoming call to a portable terminal in accordance with near-field communication (Sd1). At this time, the communication device obtains the Bluetooth ID of the portable terminal (Sd2). Subsequently, the registrant ID of the owner of the detected portable terminal is obtained from the obtained Bluetooth ID with reference to the registration information shown in FIG. 12 (Sd3).

Subsequently, the communication system specifies the location of the owner of the detected portable terminal based on the obtained registrant ID with reference to the situation data shown in FIG. 13 (Sd4). Subsequently, the communication system determines whether the communication device which detects the incoming call (owner present in room in which communication device) is provided in the specified location (Sd5). When the owner of the portable terminal is present near the communication device which detects the incoming call (or in the room) (Sd6 (Sd5—Yes)), the portable terminal is directly communication connected to the communication device in accordance with Bluetooth communication (directly communication connecting portable terminal and communication device which detects call in Bluetooth communication). The calling sound and voice received in the portable terminal may be output from the communication device which detects the incoming call (Sd7 (Sd6—Yes)).

When the owner of the portable terminal is present near a communication device different from the communication device which detects the call in block Sd6-No, the communication system forms a communication route with the communication device different from the communication device which detects the call. The communication system causes the different communication device to output the calling sound and voice received in the portable terminal (Sd8 and Sd9).

When the above communication route is formed, the communication system determines whether or not the call is stopped (Sd10). When the communication route is maintained, the communication system determines whether or not conversation ("I will answer the phone" recognized?) is started (Sd11 (Sd10—No)). If conversation is started, the communication system determined that the call is in progress (Sd12). If the communication system determines that the call is stopped (Sd10—Yes), the communication is terminated.

When the communication system determines that the owner of the portable terminal is not present in the room in which the communication device is provided in block Sd5—No, the process moves to block Sc1 shown in FIG. 7. The process of FIG. 7 begins with checking the registrant ID again. The situation of the intended person (location, unclear) is determined. A communication route is formed.

When the intended person is not registered, the device of the calling party outputs the audio reply "No registrant is found", etc.

Figure 9:
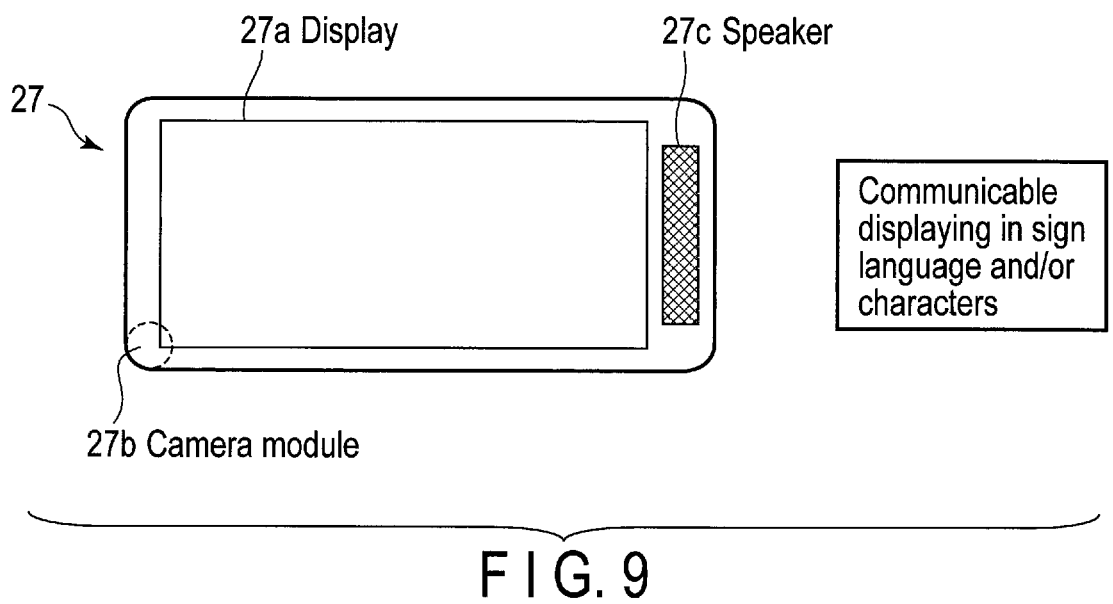
FIG. 9 shows another example of a communication device or special portable terminal.

FIG. 9 shows a communication device or portable terminal 27 according to another embodiment. This communication device or portable terminal 27 provides a dialogue application for receiving image data from the partner and transmitting image data. Thus, the communication device or portable terminal 27 comprises at least a display 27a, a camera module 27b and a speaker 27c.

When the communication device comprises the above function, the utterer can communicate with the partner displaying in sign language and/or characters, etc.

Figure 10:
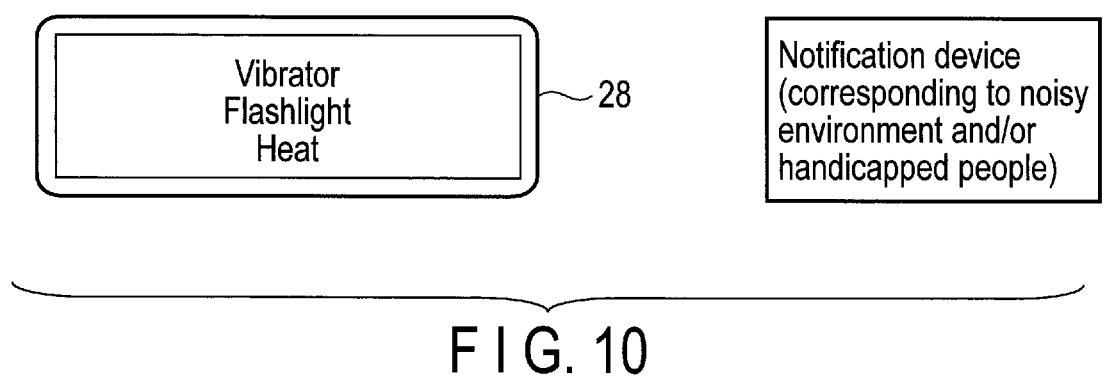
FIG. 10 shows a modification example of a special portable terminal.

FIG. 10 shows an example of a notification device 28. When the user, works in noisy environment, held the communication device shown in FIG. 9, the user may not notice an incoming call, for example. When a call is received in the communication device or portable terminal 27, the notification device 28 is capable of notifying the user of the call by vibration (with a vibrator), light flash (with a light-emitting unit), heat (with a mechanism for increasing the temperature) or a combination thereof in cooperation.

FIG. 11 shows a conceptual diagram when the above electronic apparatus and method are used in a department store (large-scale commercial facilities), a plant, etc.

In the electronic apparatus and method shown in FIG. 11, communication devices 11A, 11B, 11C and 11D may be communication connected to outside by specifying one of arbitrary portable terminals (or intercoms or IP telephones mainly used in a closed area) 271a to 271k, 271n and 271m located on arbitrary floors F3, F4, F5 and F6.

Thus, it is possible to provide, for example, sound and signals based on specific rules by specifying an area instead of an announcement over the whole building. For example, in a department store, it is possible to contact the employees, or play BGM unique to each shop. In a plant, it is possible to independently send a message as an operation instruction to the employees based on each area, also.

The example shown in FIG. 11 is also applicable to a station, a shopping mall, an underground shopping complex, etc., as a matter of course. To detect a specific portable terminal, the floor or the specific block on the floor to which an announcement should be made can be detected from the image or sound specified by the camera module of communication device 11A, 11B, . . . , of each floor. The communication may be one-way communication like the above announcement in a building.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
   a receiver configured to receive a request of communication with a first user;
   electronic circuitry configured to:
   determine whether the first user is present near a first electronic apparatus of electronic apparatuses;
   determine whether the first user is present near a second electronic apparatus of the electronic apparatuses;

establish a first communication route with the first electronic apparatus for the communication with the first user in response to the request, if it is determined that the first user is present near the first electronic apparatus; and establish a second communication route with the second electronic apparatus for the communication with the first user in response to the request, if it is determined that the first user is present near the second electronic apparatus.

2. The system of claim 1, wherein the electronic circuitry is further configured to establish a third communication route with a portable terminal of the first user, if it is determined that the first user is not present near any one of the electronic apparatus.

3. The system of claim 1, wherein the electronic circuitry is configured to determine whether the first user is present near the first electronic apparatus based on image data of a camera of the first electronic apparatus.

4. The system of claim 1, wherein the electronic circuitry is configured to determine whether the first user is present near the first electronic apparatus based on whether near-field communication is established between a portable terminal of the first user and the first electronic apparatus.

5. The system of claim 1, wherein the electronic circuitry is configured to establish a communication route with a portable terminal of the first user, if it is determined that the first user is present near the first electronic apparatus, and if the portable terminal of the first user is held by the first user.

6. The system of claim 1, wherein the electronic circuitry is configured to establish a communication route with a portable terminal of the first user, if it is determined that the first user is present near the first electronic apparatus, if the portable terminal of the first user is not held by the first user, and if the portable terminal of the first user is located in a registered place.

7. The system of claim 1, wherein if electronic circuitry is determined that an apparatus as a communication connection destination for communication with the first user is not specified, an output indicating that the communication connection destination is unclear is generated.

8. The system of claim 1, wherein the electronic circuitry is configured to establish a communication route between a portable terminal of the first user and the first electronic apparatus, if a call is received in the portable terminal of the first user.

9. The system of claim 1, wherein the receiver configured to receive a request of communication with the first user in response to an incoming call to a portable terminal of the first user.

10. A method comprising:
receiving a request of communication with a first user;
determining whether the first user is present near a first electronic apparatus of electronic apparatuses;
establishing a first communication route with the first electronic apparatus for the communication with the first user in response to the request, if it is determined that the first user is present near the first electronic apparatus;
determining whether the first user is present near a second electronic apparatus of the electronic apparatuses; and
establishing a second communication route with the second electronic apparatus for the communication with the first user in response to the request, if it is determined that the first user is present near the second electronic apparatus.

11. The method of claim 10, wherein a third communication route is established with a portable terminal of the first user, if it is determined that the first user is not present near any one of the electronic apparatus.

12. The method of claim 10, wherein whether the first user is present near the first electronic apparatus based on image data of a camera of the first electronic apparatus.

13. The method of claim 10, wherein whether the first user is present near the first electronic apparatus based on whether near-field communication is established between a portable terminal of the first user and the first electronic apparatus.

* * * * *